United States Patent [19]
Bresin

[11] 4,433,718
[45] Feb. 28, 1984

[54] THERMOSTATICALLY-REGULATED ARRANGEMENT FOR AND METHOD OF SWITCHING POWER TO A HEATING/COOLING SYSTEM, AND METHODS OF INSTALLING AND RETROFITTING THE ARRANGEMENT AT AN ELECTRICAL OUTLET BOX

[75] Inventor: Elias H. Bresin, 1020 Northern Blvd., Baldwin Harbor, N.Y. 11510

[73] Assignees: Elias H. Bresin, Baldwin Harbor; David Sanders, New York, both of N.Y. ; a part interest

[21] Appl. No.: 390,761

[22] Filed: Jun. 21, 1982

[51] Int. Cl.³ .............................................. F23N 5/20
[52] U.S. Cl. .................................. 165/12; 236/46 R; 337/302
[58] Field of Search .................... 236/46 R, 47, 68 B; 165/12; 337/301–304

[56] References Cited

U.S. PATENT DOCUMENTS

| | | | |
|---|---|---|---|
| 2,274,371 | 2/1942 | Kucera | 337/302 |
| 2,912,052 | 11/1959 | Maltby | 236/46 X |
| 3,620,448 | 11/1971 | Nelson | 236/46 R |
| 4,110,632 | 8/1978 | Wyland | 236/46 R |
| 4,257,237 | 3/1981 | Hoewisch | 236/46 R |

Primary Examiner—William E. Wayner
Attorney, Agent, or Firm—Kirschstein, Kirschstein, Ottinger & Israel

[57] ABSTRACT

A line voltage thermostat is replaced by a low voltage clock-controlled thermostat without the need to install a switching relay in the basement of a house. Instead, a transformer-controller adapter unit is mounted within an electrical outlet box at which the thermostat is mounted. The adapter unit can be wired to the hot and the load wires at the outlet box without requiring any connection to a neutral wire.

23 Claims, 4 Drawing Figures

THERMOSTATICALLY-REGULATED ARRANGEMENT FOR AND METHOD OF SWITCHING POWER TO A HEATING/COOLING SYSTEM, AND METHODS OF INSTALLING AND RETROFITTING THE ARRANGEMENT AT AN ELECTRICAL OUTLET BOX

BACKGROUND OF THE INVENTION

1. Field of the Invention

This invention relates to a thermostatically-regulated power control arrangement for, and method of, switching an electrical power source to a heating/cooling system load. More particularly, this invention relates to a method of installing the power control arrangement at an electrical outlet box, as well as to a retrofitting method of replacing a line voltage thermostat with a low voltage thermostat.

2. Description of the Prior Art

A conventional heating/cooling system load, such as a hot water circulator, is typically controlled in many homes by a line voltage thermostat operative for sensing the temperature in a room whose temperature is to be regulated, and for cycling the circulator on when the room temperature falls below a preset temperature, and for cycling the circulator off when the room temperature rises above the preset temperature. The preset temperature is manually set in advance to a single temperature value. The conventional line voltage thermostat is a simple on-off heavy-duty switch connected in series between the circulator and an electrical power source, and operative to conduct the maximum current required by the circulator. The conventional line voltage thermostat is mounted on a wall of the room in front of a convenient electrical outlet box to which a load wire from the circulator and a hot wire from the power source are routed for connection to the thermostat switch.

Although generally satisfactory for its intended purpose, the conventional line voltage thermostat has not proven to be an altogether practical fuel-efficient device for the reason that once the thermostat has been manually set to the preset temperature, it must be manually reset if the resident wishes to change the temperature. To improve fuel efficiency, a resident may wish to change the preset temperature several times during every day/night cycle. For example, the resident may wish to lower the preset temperature at night to sleep cool, or to have the preset temperature raised in the morning to wake up to comfort. Alternatively, the resident may wish to lower the preset temperature during the day while away from home, or to have the preset temperature raised at dusk just before returning home. In these and countless other situations, energy is wasted if the resident forgets to, or simply chooses not to, or is unable to, timely reset the thermostat. In any event, the manual adjustment of the preset temperature on conventional line voltage thermostats is, at best, a coarse one, thereby further contributing to the overall inefficient operation.

To improve fuel efficiency, clock-controlled, programmable, setback-type thermostats have been proposed for automatically maintaining one of two preset temperatures as a function of time. The clock-controlled thermostats are separately adjustable and programmable such that the resident may select a low preset temperature for any one desired time period, and may select a different high preset temperature for any other desired time period. Typically, during the winter heating season, the clock-controlled thermostat is set and programmed to automatically lower the temperature at night, and to raise it in the morning. Inasmuch as the clock-controlled thermostat typically has a thermostat switch designed to switch low voltage and low current, switching relays have always been used with this type of thermostat. The switching relay includes a transformer for lowering the incoming high line voltage to the low voltage which can be safely switched by the thermostat switch, and a relay having a heavy-duty relay switch which can safely handle the high voltage and current required by the heating/cooling system load.

Although generally satisfactory for their intended purpose, the clock-controlled thermostats and associated switching relays have not proven to be altogether practical in terms of home installation. The known switching relays must be installed in the home by being connected to three different wires, namely, the hot, neutral and load wires. The hot and neutral wires are connected to a power source, typically at the circuit breaker box in the basement of a house. The load wire is connected to a hot water circulator, typically located in the basement near the furnace and boiler of the heating/cooling system. Hence, for practical reasons, the known switching relays are always installed in the basement where the aforementioned hot, load and neutral wires are all present.

There are many difficulties associated with the requirement of installing the switching relay in the basement. First of all, it is often difficult for a homeowner or electrician to even find the hot, load and neutral wires in the basement, particularly when the latter is crowded and unlit. Secondly, the wiring is often concealed in a finished basement, and is typically not available at exposed locations, thereby requiring the breaking of walls to expose the wiring. This is not only an expensive undertaking, but is also highly undesirable, particularly when the basement is finished. Thirdly, the homeowner himself, or an electrician's helper, may not be qualified or skilled enough to properly connect the three wires to the switching relay. Fourthly, some homeowners object, for reasons of safety, to the mere fact that an electrician must enter the basement to make the necessary three-wire connection between the switching relay and the circulator. Fifthly, the cost of basement installation is typically very expensive and time consuming not only due to the aforementioned wiring difficulties, but also due to the fact that the prior art switching relay is itself a large, expensive component. Finally, in the event that a homeowner wishes to replace the conventional line voltage thermostat with the more modern clock-controlled thermostat, the aforementioned wiring difficulties, safety aspects and high expense of installation may cause the homeowner to forego the retrofitting installation, thereby wasting fuel and energy.

SUMMARY OF THE INVENTION

1. Objects of the Invention

Accordingly, it is the general object of the present invention to overcome the difficulties and drawbacks of the prior art.

Another object of this invention is to replace a line voltage thermostat with a low voltage, clock-controlled thermostat without requiring the homeowner or electrician to enter the basement of a house.

An additional object of this invention is to eliminate the requirement of installing a switching relay in the house basement.

Another object of this invention is to avoid the problem of having the homeowner or electrician hunt for wiring in crowded, unlit basements.

Still another object of this invention is to avoid the problem of having the homeowner or electrician break down walls, particularly in finished basements, to expose concealed wiring.

Yet another object of this invention is to eliminate the problem of having unskilled people making the necessary prior art three-wire connection between the heating/cooling system and a switching relay.

Another object of this invention is to eliminate the fear associated with a stranger's entering the basement to retrofit the thermostatically-regulated heating/cooling system.

An additional object of this invention is to simplify and reduce the cost of installation and retrofitting the thermostatically-regulated heating/cooling system.

Another object of this invention is to increase the fuel efficiency of the thermostatically-regulated heating-/cooling system.

Still another object of this invention is to provide a reliable, compact, inexpensive-to-manufacture, long-lasting, durable, power control arrangement for switching an electrical power source to a heating/cooling system load.

An additional object of this invention is to provide a novel method of switching an electrical power source to a heating/cooling system load, as well as a method of installing the power control arrangement at an electrical outlet box.

Yet another object of this invention is to provide a novel retrofitting method of replacing a line voltage thermostat with a low voltage thermostat at an electrical outlet box.

2. Features of the Invention

In keeping with these objects, and others which will become apparent hereinafter, one feature of the invention resides, briefly stated, in a compact temperature-regulated power control arrangement for, and method of, switching an electrical power source at a rated line voltage to a heating/cooling system load, which comprises low voltage-operated thermostat means mounted at an electrical outlet box in a room whose temperature is to be regulated, and being settable at any desired predetermined time and temperature characteristic. The low voltage-operated thermostat means is operative for sensing the room temperature, and has a low voltage-operated thermostat switch switchable at a low voltage below the line voltage between a heat-off condition in which a heat-off signal is generated when the sensed temperature is above a set temperature, and a heat-on condition in which a low voltage heat-on signal is generated when the sensed temperature is below the set temperature.

The power control arrangement further includes compact transformer means operatively connected between the power source and the thermostat means, and operative for converting the line voltage to the low transformer voltage required to operate the thermostat switch. The power control arrangement also includes compact control means operatively connected between the thermostat means and the load, and operative for conducting power to the load in the heat-on condition, and for interrupting power to the load in the heat-off condition.

In accordance with this invention, the power control arrangement includes means for mounting the compact transformer means and the compact control means at, and preferably within, the electrical outlet box that is located in the room whose temperature is to be regulated. This is in contrast to the prior art requirement of installing the switching relay in the house basement which is remote from the aforementioned room. The box mounting avoids the above-described wiring installation, safety and high installation cost problems associated with requiring the homeowner or electrician to enter the basement and make the necessary three-wire connection between the switching relay and the circulator component of the heating/cooling system. Thus, the retrofit replacement of a conventional line voltage thermostat with a low voltage thermostat is greatly simplified.

In a home wiring system, the electrical power source typically has a hot, a neutral and a ground wire connection. The circulator of the heating/cooling system load has a load wire connected thereto. Typically, only the hot, load and ground wires are routed through the house to the electrical outlet boxes. In some cases, however, the neutral wire is also routed to the outlet boxes. During installation, the power control arrangement of this invention can be connected to the hot, load, neutral and ground wires at the outlet box at which the thermostat is mounted. However, since in the typical case, only the hot and the load wires are present at the outlet box, it is an advantageous feature of this invention that the power control arrangement has been designed such that it needs to be connected only to the hot and the load wires. Put another way, the power control arrangement of this invention does not require any connection to the neutral wire of the power source. This is in contrast to the prior art switching relays which did require a connection to the neutral wire.

Another feature of this invention resides in a method of installing the power control arrangement at the electrical outlet box, as well as in a retrofitting method of replacing a conventional line voltage thermostat with a clock-controlled low voltage thermostat at the outlet box. As noted previously, the prior art switching relay is a relatively large component consisting of a transformer and an electro-magnetic relay. Inasmuch as the prior art switching relay is larger than an outlet box, it has not heretofore been known to mount a transformer means and a control means at, and certainly not in, the outlet box. Furthermore, inasmuch as the prior art switching relay requires to be connected to a neutral wire, which is typically not present at the outlet box, it has not heretofore been proposed to mount the transformer means and the control means at the outlet box.

Still another factor to be considered in the novel mounting of the transformer means and the control means of this invention in the outlet box is that there are industrial guidelines which dictate the maximum volume that electrical devices placed in an outlet box can occupy. Typically, electrical devices, such as light dimmer switches, should not occupy more than one-half of the box volume. In the case of the compact transformer means and the compact control means of this invention, the one-half box volume requirement is satisfied.

Another advantageous feature of this invention is that the control means includes an optically-based component for optically isolating the heat-off signal from the load, and for optically coupling the heat-on signal to the load. The optical nature of the control means assists in electrically isolating the line voltage of the power source from the low voltage heat-on signal generated by the thermostat.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
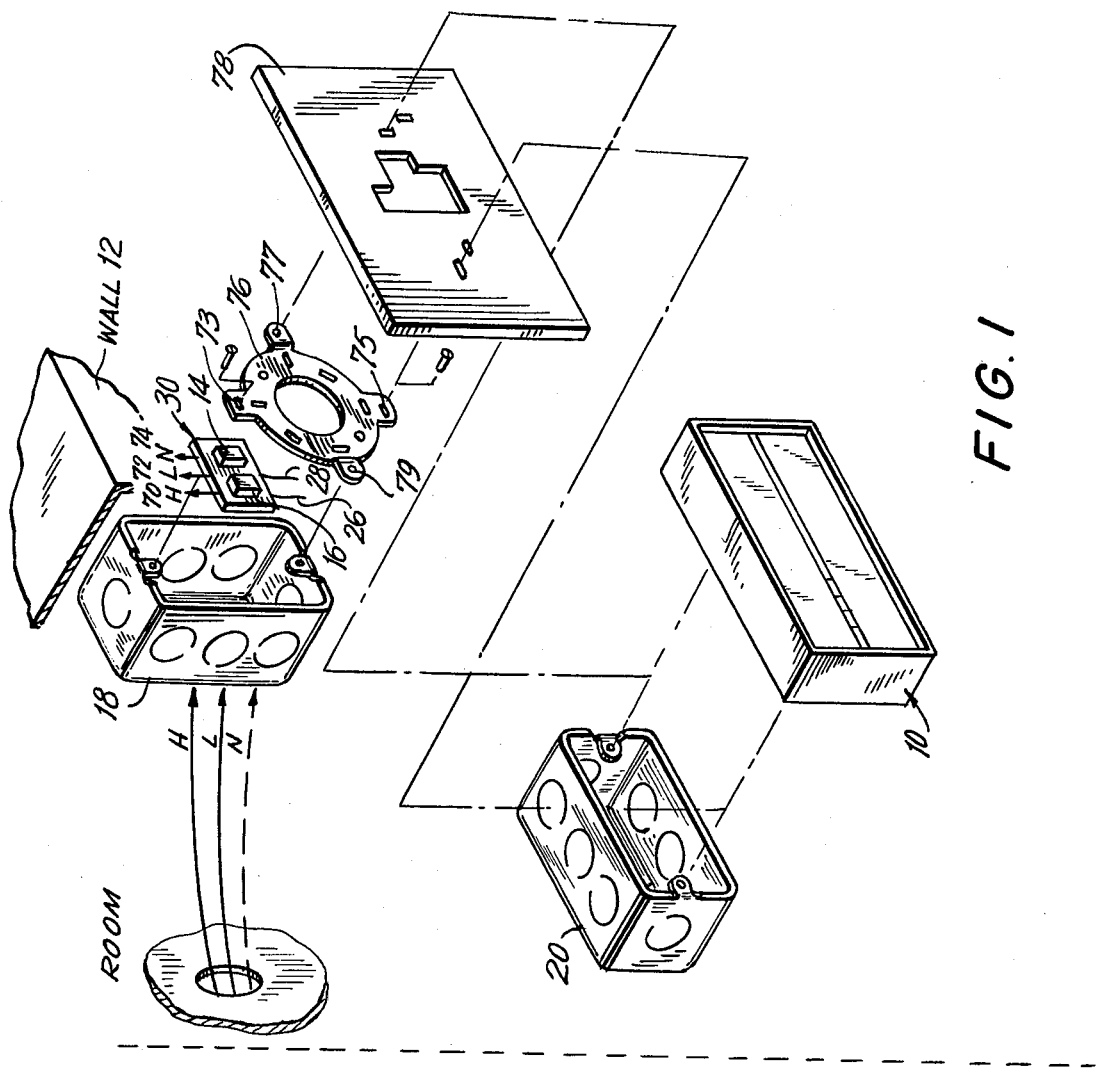
FIG. 1 is a diagrammatic exploded view of a method of switching an electrical power source to a heating-/cooling system load, of a method of installing a compact power control arrangement at an electrical outlet box in either a horizontal or a vertical orientation, and of a retrofitting method of replacing a line voltage thermostat with a low voltage thermostat, all in accordance with the present invention.

Referring now to the drawings and particularly to FIG. 1, the power control arrangement includes a low voltage-operated thermostat means 10 mounted exteriorly of a wall 12 of a room whose temperature is to be regulated, and a compact transformer means 14 and a compact control means 16 which are mounted at, and preferably within, an electrical outlet box that is mounted interiorly of the wall 12. The outlet box can be positioned in either the vertical orientation as identified by reference numeral 18, or the horizontal orientation as identified by reference numeral 20.

Figures 2, 3, 4:
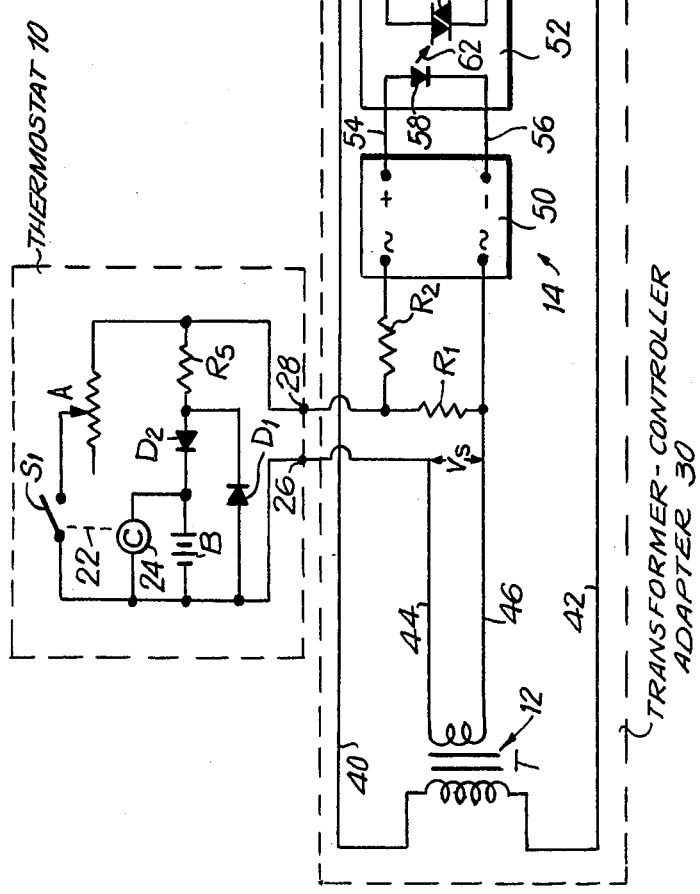
FIG. 2 is an electrical schematic of the thermostatically-regulated power control arrangement to be installed in accordance with the methods shown in FIG. 1, and as connected to the power source and the heating/cooling system load in accordance with a first wiring option.
FIG. 3 is a second wiring option for the interconnection between the power source and the heating/cooling system load.
FIG. 4 is a third wiring option for the interconnection between the power source and the heating/cooling system load.

As best shown in FIG. 2, the thermostat means 10 is a clock-controlled, time-and temperature- settable, programmable, setback-type, low voltage-operated thermostat having a bi-metallic contact-type or mercury-type thermostat switch $S_1$ operatively connected through an electro-mechanical linkage, as diagrammatically represented by line of action 22, to a timer means or clock 24. This type of low voltage thermostat is well known in the art, and can be obtained commercially from the Honeywell Corporation as its Model No. T8082A Fuel Saver Thermostat. The low voltage thermostat 10 typically has a low temperature lever and a high temperature lever, each of which can be manually preset to any desired low or high temperature, respectively. Similarly, the clock 24 is provided with setting pins which are manually positioned by a user to select any two different time periods during the 24 hour day/-night cycle. Thus, the user may select any low preset temperature for any desired time period, e.g. daytime, and may select any high preset temperature for any other desired time period, e.g. nighttime. In this manner, the low voltage thermostat 10 can be programmed to suit the user's particular heating/cooling requirements, thereby promoting fuel efficiency.

The thermostat switch $S_1$ is designed to switch low voltages (15 v to 30 v) and low currents (under 1 amp.). This is in contrast to the conventional old-fashioned line voltage thermostats which are designed to switch line voltages on the order of 115 v and high load currents over 1 amp. In standard operation, the thermostat switch $S_1$ which is mounted on the wall 12 senses the room temperature, and closes when the sensed temperature is below the preset temperature selected for that particular time. As will be shown below, the closure of switch $S_1$ generates a low voltage heat-on signal and defines a heat-on condition in which the heating/cooling system is activated to heat the room and bring its room temperature up to the preset temperature. If the sensed temperature is above the preset temperature, then the switch $S_1$ will open, and prevent further generation of the heat-on signal. Put another way, the opening of the switch $S_1$ generates a heat-off signal and defines a heat-off condition in which the heating/cooling system is deactivated such that the room temperature will eventually cool down to the preset temperature.

The thermostat 10 includes a heat anticipator means or heating coil A connected in series with the thermostat switch $S_1$ and located in the immediate circumambient region thereof. Any current flowing through the coil, when the switch $S_1$ is closed, causes a low level heating effect in the immediate vicinity of the switch $S_1$. This local heating tends to shorten the time required for the thermostat to react to the rising ambient temperature caused by the activation of the heating/cooling system. This heat anticipator action tends to prevent objectionable temperature overshoot of the room temperature. The resistance of the coil is manually adjustable to control the duration of the heat-on condition.

The clock 24 can either be powered by a separate low voltage alternating current line, or by a rechargeable battery B as shown. The battery is recharged by a recharger consisting of the resistor $R_5$ and the rectifying diodes $D_1$ and $D_2$. As described below, the battery is recharged during the heat-off condition, and the clock is powered from the power source. During the heat-on condition, the clock is powered solely by the battery.

The compact transformer means 12 and the compact control means 14 are electrically connected together as an integral transformer-controller adapter unit 30. The thermostat 10 is connected to the adapter 30 by means of a pair of thermostat wires 26,28.

Referring again to FIG. 1, an electrical power source 32 is schematically represented by a circuit breaker box located in a house basement which is remote from the room in which the thermostat 10 is mounted. The circuit breaker box 32 has a hot wire H, a neutral wire N, and a ground wire G. Also located in the basement are various components of the heating/cooling system load, namely the burner 34, the boiler 36 and the circulator 38. The burner operates independently of the thermostat and heats the water in the boiler 36 to maintain the water temperature at a predetermined value. The circulator 38 is only intermittently operative, and pumps the heated boiler water through the house plumbing system when a heat-on condition is sensed, and does not pump the heated boiler water through the house plumbing system when a heat-off condition is sensed. The hot and neutral wires of the power source 32 are connected to the circulator 38, usually through a non-illustrated junction box. A load wire L is connected to the circulator. In some home wiring systems, the hot, neutral, load and ground wires are routed from the basement to every outlet box in every room in the house. However, in the typical case, as shown in FIG. 1, only the hot and load wires are routed to the outlet box on which thermostat 10 is mounted. The dashed line representation of the neutral wire in FIG. 1 is intended to indicate that the neutral wire may or may not be present at the outlet box.

In the electrical schematic diagram of FIG. 2, it is assumed that the hot, load and neutral wires are all available at the outlet box. Hence, the transformer means 12 includes a transformer T having a primary winding with output conductor 40 connected to the hot wire, and with the output conductor 42 connected to the neutral wire. The transformer T also includes a secondary winding with output conductor 44 connected to the thermostat wire 26, and with the output conductor 46 connected to the thermostat wire 28 through the resistor $R_1$. The voltage across the secondary winding between the conductors 44,46 is designated as $V_S$. The winding ratio of the primary and secondary windings is such that the secondary voltage $V_S$ is about 24 v when the input line voltage is about 115 v. Preferably, a low profile compact transformer having a volume less than half of that of an electrical outlet box is employed.

In operation, the line voltage at the hot and neutral terminals of the adapter 30 is reduced by the transformer to the low voltage required by the thermostat 10. The resistor $R_1$ is sized to provide the low current required by the heat anticipator coil. Since the resistance of the resistor $R_1$ is much greater than the resistance of the heat anticipator coil, the current through the coil is approximately determined by $V_S/R_1$. The high resistance of resistor $R_1$ protects the coil and the switch $S_1$ from conducting a current of excessive magnitude.

Since the maximum resistance of the coil is no more than several ohms (3-4 ohms) and the current is usually under 1 amp (typically 0.2 amp), a relatively small voltage (less than 1 v) exists across the transformer wires 26,28 in the heat-on condition. The voltage is less than that required to operate the clock 24. Thus, during the heat-on condition, the clock 24 derives its operating current from the rechargeable battery. The battery is charged during the heat-off condition when the switch $S_1$ is open, and the voltage across the transformer wires 26,28 is close to the full low voltage (24 vAC) supplied by the transformer. In the heat-off condition, the battery which has a nominal open circuit voltage of about 1.3 volts is charged by the current passing through limiting resistor $R_5$. Since the supply voltage is AC, the diode $D_2$ is used to allow only the positive half cycle to flow into the positive terminal of the battery, while the diode $D_1$ bypasses the negative half cycle around the battery. Once the battery is fully charged, it can power the clock, or more particularly the clock motor, during the heat-on condition when the secondary winding voltage $V_S$ is essentially shorted out by the switch $S_1$.

The control means 14 is operatively connected between the thermostat and the circulator 38, and is operative for conducting power to the circulator in the heat-on condition, and for interrupting power to the circulator in the heat-off condition. The control means is of solid-state, integrated circuit, miniature component construction, and includes a full wave bridge rectifier 50, an optically-isolated triac driver 52, and a triac $Q_1$.

When the thermostat calls for heat in the heat-on condition, the switch $S_1$ closes and causes the voltage across the resistor $R_1$ to rise in magnitude towards the secondary voltage $V_S$ (24 v). This low voltage heat-on signal is conducted through the current-limiting resistor $R_2$ to one input terminal of the rectifier 50, the other input of which is connected to the conductor 46. The low voltage alternating current heat-on signal is full wave rectified to produce a pulsating direct current across the output conductors 54,56 to the driver 52.

The driver 52 has an input stage consisting of a gallium-arsenide infrared light emitting diode 58 which is optically coupled along a light path, as diagrammatically represented by arrow 62, to a light-sensitive silicon bilateral switch 60. A suitable driver for this purpose is sold by the Motorola Corporation as its Model No. MOC3009. When the current level in the diode 58 exceeds a threshold value, the diode 58 emits a light which is coupled to the switch 60, thereby causing the latter to avalanche, i.e., to suddenly decrease its impedance. This occurs each time a direct current pulse is conducted to the diode 58.

The triac or thyristor $Q_1$ has its main terminals $M_1,M_2$ connected between the hot and the load wires. The bilateral switch 60 is connected at one end thereof to main terminal $M_1$ through resistor $R_3$, and at its opposite end thereof to the gate G of the triac. A snubber circuit consisting of resistor $R_4$ and capacitor $C_1$ is connected across the main terminals of the triac. A triac suitable for use in the circuit is sold by the Motorola Corporation as its Model No. MAC3030-8.

Each time the bilateral switch 60 suddenly drops in impedance, alternating current from the hot wire flows through the limiting resistor $R_3$ into the gate of the triac. This gate current latches the triac into its conducting state or switched-on condition, in which the impedance between the main triac terminals drops to a very low value. Since the triac is a bi-directional device, both the positive and the negative cycles of the alternating current will flow through it. When the triac conducts, the power source is directly switched to the circulator 38.

The snubber circuit reduces the rate of rise of voltage across the main triac terminals, which rate of rise can be quite considerable due to the highly inductive nature of the circulator. The snubber circuit prevents the triac from being turned on, without the presence of the gate current, merely because the voltage across the main triac terminals has risen too rapidly.

Each time no direct current pulse is conducted to the diode 58, the impedance of the bilateral switch 60 remains high, and there will be no gate current. In this event, the triac will be in a non-conducting state or switched-off condition. The power source is now disconnected from the load.

It will be noted that the triac, once triggered, will remain conducting, but only until the current drops to below the minimum threshold current below which the triac will extinguish itself in the absence of any gate current. This event will occur each half cycle of the line voltage AC waveform after each zero crossing thereof. Hence, the AC gate current must be repeatedly reapplied to maintain the triac in the conducting state. Each time the gate current is applied to the gate terminal, the triac latches on and stays on until the next zero crossing whereupon the gate current must be reapplied.

The output terminals 70,72,74 of the adapter are respectively connected to the hot, load and neutral wires in the 3-wire wiring option shown in FIG. 2. The transformer 12 is continuously energized during the heat-on and heat-off conditions, and hence, continuously provides anticipator current to the heat anticipator coil.

The 2-wire wiring options shown in FIGS. 3 and 4 show the wiring situation which typically occurs at the outlet box when the neutral wire is not present thereat. In FIG. 3, the output terminals 72 and 74 are tied together and connected to the load wire, while the output terminal 70 is connected to the hot wire. In FIG. 4, the output terminals 70 and 74 are tied together and connected to the hot wire, while the output terminal 72 is connected to the load wire. In either case, there is no neutral wire to be separately connected to the adapter 30.

Hence, in either the FIG. 3 or FIG. 4 2-wire option, when the thermostat is not calling for heat, the switch $S_1$ is open; the triac $Q_1$ is not conducting; the primary winding of the transformer 12 is not shorted out by the open triac $Q_1$; and the transformer supplies battery-charging current to the thermostat. When the thermostat calls for heat, the switch $S_1$ is closed; gate current is applied to the triac latching it into its conducting state; the primary winding of the transformer 12 is essentially shorted out by the conducting triac $Q_1$; and there is essentially no output voltage from the secondary winding of the transformer to supply current for the heat anticipator coil. Hence, the 2-wire options cannot provide heat anticipator current. Of course, power is being supplied to the load through the shorted triac.

At the next zero crossing of current through the triac, the triac will stop conducting, and the line voltage supplied to the primary winding of the transformer will begin to rise. If the thermostat switch $S_1$ is open, then the triac will remain non-conducting, thus removing power from the circulator, but restoring power to the transformer. If the thermostat switch $S_1$ remains closed, then the gate current will be reapplied to the triac through the transformer 12 and the controller 14, thereby causing the triac to latch into the conducting state, and to remain in this state for the remainder of the next half cycle. Thus, the circulator remains energized, but negligible anticipator current is conducted through the heat anticipator coil.

Nevertheless, the triac has a finite voltage drop (less than 1 v) across it in its conducting state. Hence, power is dissipated in the triac when it is conducting load current. When the load is de-energized, the triac dissipates no power. Thus, the power dissipation of the triac in the heat-on condition can be used as a local heat source which can serve the heat anticipator function if the heat dissipated by the triac is conducted to the immediate vicinity of the thermostat switch. Even though the transformer-controller adaptor 30 is mounted within the electrical outlet box, and the thermostat switch is mounted exteriorly of the box, I have found by testing that the adapter 30 is close enough to the switch to generate a heat anticipator function to prevent temperature overshoot.

Since modern low voltage clock-controlled thermostats are designed to operate at low voltages, the transformer-controller adapter 30 must be designed to isolate the thermostat 10 from the high line voltage. As shown in FIG. 2, the thermostat is connected to the power line only through the transformer 12 and the driver 52. Isolation across the transformer is maintained by its primary to secondary insulation. This is a function of the design and construction of the transformer. Isolation across the driver 52 is maintained by the aforementioned optically-transparent, electrically non-conductive material located in the light path 62 between the diode 58 and the bilateral switch 60. Thus, the transformer 12 and the driver 52 completely electrically isolate the thermostat from the hot wire of the power source.

As noted earlier, the use of solid state components in the adapter in place of a power-consuming, bulky switching relay permits the adapter unit 30 to be small in size. This is essential since local electrical codes limit the volume which can be occupied by a component installed in an electrical outlet box.

As shown in FIG. 1, the adapter unit 30 is mounted within the vertically-oriented outlet box 18 by means of a pair of opposed lugs 73,75 of an adapter ring 76, which serves as a mounting means. A cover plate 78 covers the adapter ring. In the event that a horizontally-oriented outlet box 20 is mounted at the wall 12, then the other pair of opposed lugs 77,79 of the adapter ring can be used to mount the adapter. The thermostat 10 is mounted on the cover plate 78 which is, in turn, supported by the adapter ring.

In order to replace a conventional line voltage thermostat with a clock-controlled low voltage thermostat, the line voltage thermostat is first removed from the outlet box, and thereupon the adapter 30 is connected to the hot and load wires, and sometimes to the neutral wire if the latter is present. Thereupon, the adapter is connected to the low voltage thermostat which is then mounted on the electrical outlet box. The retrofitting operation is quite simple and easy to perform. There is no need to install the large, bulky switching relay of the prior art, nor any need to enter the basement, nor any need to rewire the existing wiring associated with the heating/cooling system. The invention thus eliminates the expense of installing and wiring a prior art switching relay into the heating/cooling system.

It will be understood that each of the elements described above, or two or more together, may also find a useful application in other types of constructions differing from the types described above.

While the invention has been illustrated and described as embodied in a THERMOSTATICALLY-REGULATED ARRANGEMENT FOR AND METHOD OF SWITCHING POWER TO A HEATING/COOLING SYSTEM, AND METHODS OF INSTALLING AND RETROFITTING THE ARRANGEMENT AT AN ELECTRICAL OUTLET BOX, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is new and desired to be protected by the Letters Patent is set forth in the appended claims.

1. A compact temperature-regulated power control arrangement for switching an electrical power source at a rated line voltage to a heating/cooling system load, comprising:

(a) low voltage-operated thermostat means mounted at and in front of an electrical outlet box in a room whose temperature is to be regulated, and being settable at any desired predetermined time and temperature characteristic, said thermostat means being operative for sensing the room temperature, and having a low voltage-operated thermostat switch switchable at a low voltage below the line voltage between a heat-off condition in which a heat-off signal is generated when the sensed temperature is above a set temperature, and a heat-on condition in which a low voltage heat-on signal is generated when the sensed temperature is below the set temperature;

(b) compact transformer means operatively connected between the power source and the thermostat means, for converting the line voltage to the low transformer voltage required to operate the thermostat switch;

(c) compact control means operatively connected between the thermostat means and the load, for conducting power to the load in the heat-on condition, and for interrupting power to the load in the heat-off condition; and (d) means for mounting the compact transformer means and the compact control means rearwardly of the thermostat means and within the electrical outlet box, to simplify the retrofit replacement of a conventional line voltage-operated thermostat with a low voltage-operated thermostat.

2. The power control arrangement as defined in claim 1, wherein the heating/cooling system load includes a circulator located in a house basement which is remote from the room in which the thermostat means is mounted, and wherein the transformer means and the control means are installed within the electrical outlet box of the room, to thereby eliminate the necessity of entering the basement for installation purposes as is the case for prior art switching relays.

3. The power control arrangement as defined in claim 1, wherein the thermostat means includes a timer means operatively connected to the thermostat switch and powered by a rechargeable battery means, and wherein the transformer means conducts the low transformer voltage to the rechargeable battery means for charging the latter during the heat-off condition, and for powering the timer means during the heat-on condition.

4. The power control arrangement as defined in claim 1, wherein the transformer means includes a primary winding operatively connected to the power source, and a secondary winding operatively connected to the thermostat means, said secondary winding having less turns of winding than the primary winding to thereby generate the low transformer voltage.

5. The power control arrangement as defined in claim 1, wherein the control means is constituted by miniature solid-state components.

6. The power control arrangement as defined in claim 1, wherein the thermostat means generates the low voltage heat-on signal with an alternating current waveform, and wherein the control means includes rectifier means for rectifying the alternating heat-on signal to a rectified direct current-type signal during the heat-on condition.

7. The power control arrangement as defined in claim 6, wherein the control means further includes trigger-able switching means for conducting the line voltage of the power source to the load in a switched-on condition, and for preventing conduction of the line voltage to the load in a switched-off condition; and wherein the control means also includes drive means operatively connected between the rectifier means and the switching means, for triggering the switching means to the switched-on condition in response to generation of the rectified signal during the heat-on condition.

8. The power control arrangement as defined in claim 7, wherein the drive means includes means for optically isolating the line voltage from the low transformer voltage and the low voltage heat-on signal.

9. The power control arrangement as defined in claim 8, wherein the drive means includes an infrared light emitting diode optically coupled to a silicon bilateral switch.

10. The power control arrangement as defined in claim 7, wherein the switching means includes a triac having a pair of main terminals and a gate terminal, and wherein the drive means generates a trigger signal and conducts the latter to the gate terminal for triggering the triac from the switched-off to the switched-on condition.

11. The power control arrangement as defined in claim 10, wherein the switching means includes snubber means across the main terminals of the triac, for reducing the rate of rise of the line voltage applied across the main terminals.

12. A compact temperature-regulated power control arrangement for switching an electrical power source at a rated line voltage to a heating/cooling system load, comprising:

(a) low voltage-operated thermostat means located in front of an electrical outlet box in a room whose temperature is to be regulated, and being settable at any desired time and temperature characteristic, said thermostat means being operative for sensing the room temperature, and having a low voltage-operated thermostat switch switchable at a low voltage below the line voltage between a heat-off condition in which a heat-off signal is generated when the sensed temperature is above a set temperature, and a heat-on condition in which a low voltage heat-on signal is generated when the sensed temperature is below the set temperature;

(b) compact transformer means within the electrical outlet box and operatively connected between the power source and the thermostat means, for converting the line voltage to the low transformer voltage required to operate the low voltage-operated thermostat switch; and (c) compact optically-based control means within the electrical outlet box and operatively connected between the thermostat means and the load, for conducting power to the load in the heat-on condition, and for interrupting power to the load in the heat-off condition.

13. A method of switching an electrical power source at a rated line voltage to a heating/cooling system load, comprising the steps of:

(a) sensing the room temperature in a room whose temperature is to be regulated by mounting at an electrical outlet box therein a time- and temperature-settable low voltage-operated thermostat switchable at a low voltage below the line voltage between a heat-off condition in which a heat-off signal is generated when the sensed temperature is above a set temperature, and a heat-on condition in which a low voltage heat-on signal is generated when the sensed temperature is below the set temperature;

(b) converting within the electrical outlet box the line voltage to the low voltage required to operate the thermostat;

(c) optically isolating within the electrical outlet box the heat-off signal from the load to interrupt power thereto in the heat-off condition; and (d) optically coupling within the electrical outlet box the heat-on signal to the load to conduct power thereto in the heat-on condition.

14. A method of installing a compact temperature-regulated control arrangement for switching an electrical power source at a rated line voltage to a heating-/cooling system load, comprising the steps of:

(a) mounting a low voltage-operated thermostat means at and in front of an electrical outlet box in a room whose temperature is to be regulated;

(b) setting the thermostat means at any desired predetermined time and temperature characteristic for sensing the room temperature, and switching the thermostat means at a low voltage below the line voltage between a heat-off condition in which a heat-off signal is generated when the sensed temperature is above a set temperature, and a heat-on condition in which a low voltage heat-on signal is generated when the sensed temperature is below the set temperature;

(c) operatively connecting a converter between the power source and the load, for converting the line voltage to the low voltage required to operate the thermostat means;

(d) operatively connecting a controller between the thermostat means and the load, for conducting power to the load in the heat-on condition, and for interrupting power to the load in the heat-off condition; and (e) mounting the converter and the controller rearwardly of the thermostat means and within the electrical outlet box, to simplify the retrofit replacement of a conventional line voltage-operated thermostat with a low voltage-operated thermostat.

15. The method as defined in claim 14, wherein the steps of mounting the converter and the controller include the steps of inserting both the converter and the controller into the electrical outlet box with clearance.

16. The method as defined in claim 14, wherein the heating/cooling system load is located in a house basement which is remote from the room in which the thermostat means is mounted, and wherein the steps of connecting the converter and the controller include the steps of installing the converter and the controller only in the room, to thereby eliminate the necessity of entering the basement for installation purposes as is the case for prior art switching relays.

17. A retrofitting method of replacing a line voltage-operated, manually temperature-settable thermostat with a low voltage-operated, time- and temperature-settable thermostat in a premises having a hot wire connected to an electrical power source at line voltage and routed to an electrical outlet box behind the line voltage-operated thermostat in a room whose temperature is to be regulated, and also having a load wire connected to a heating/cooling system load in a basement remote from the room and routed back to the electrical outlet box, comprising the steps of:

(a) removing the line voltage-operated thermostat from the electrical outlet box, and exposing the hot and load wires located thereat;

(b) operatively connecting a converter between the hot and load wires, for converting the line voltage to the low voltage required to operate the low voltage-operated thermostat;

(c) operatively connecting a controller between the hot and load wires, for controlling the flow of power from the power source to the load in response to thermostat operation;

(d) mounting the converter and the controller within the electrical outlet box;

(e) operatively connecting the converter and the controller to the low voltage-operated thermostat; and (f) mounting the low voltage-operated thermostat on the electrical outlet box in front of the converter and the controller.

18. The retrofitting method as defined in claim 17, wherein the step of mounting the converter and the controller includes the step of inserting the converter and the controller with clearance into the interior of the electrical outlet box.

19. The retrofitting method as defined in claim 17, wherein the steps of connecting the converter and the controller are performed solely in the room at the electrical outlet box, to thereby eliminate the necessity of entering the basement for installation purposes.

20. A compact temperature-regulated power control arrangement for switching an electrical power source having a hot wire and a neutral wire at a rated line voltage to a heating/cooling system load having a load wire, comprising:

(a) low voltage-operated thermostat means mounted at an electrical outlet box to which only the hot and load wires are routed in a room whose temperature is to be regulated, and being settable at any desired predetermined time and temperature characteristic, said thermostat means being operative for sensing the room temperature, and having a low voltage-operated thermostat switch switchable at a low voltage below the line voltage between a heat-off condition in which a heat-off signal is generated when the sensed temperature is above a set temperature, and a heat-on condition in which a low voltage heat-on signal is generated when the sensed temperature is below the set temperature;

(b) compact transformer means operatively connected between the power source and the thermostat means, for converting the line voltage to the low transformer voltage required to operate the thermostat switch;

(c) compact control means operatively connected between the thermostat means and the load, for conducting power to the load in the heat-on condition, and for interrupting power to the load in the heat-off condition;

(d) means for mounting the compact transformer means and the compact control means at the electrical outlet box, to simplify the retrofit replacement of a conventional line voltage-operated thermostat with a low voltage-operated thermostat; and (e) said transformer means and said control means being operatively connected only to the hot and the load wires, to thereby eliminate the necessity of connection to the neutral wire as is the case for prior art switching relays.

21. A compact temperature-regulated power control arrangement for switching an electrical power source having a hot wire and a neutral wire at a rated line voltage to a heating/cooling system load having a load wire, comprising:

(a) low voltage-operated thermostat means mounted at an electrical outlet box to which the hot, neutral and load wires are routed in a room whose temperature is to be regulated, and being settable at any desired predetermined time and temperature characteristic, said thermostat means being operative for sensing the room temperature, and having a low voltage-operated thermostat switch switchable at a low voltage below the line voltage between a heat-off condition in which a heat-off signal is generated when the sensed temperature is above a set temperature, and a heat-on condition in which a low voltage heat-on signal is generated when the sensed temperature is below the set temperature, said thermostat means including heat anticipator means for generating a low level heating effect in the circumambient region of the thermostat switch to shorten the time required by the latter to maintain the heat-on condition;

(b) compact transformer means operatively connected between the power source and the thermostat means, for converting the line voltage to the low transformer voltage required to operate the thermostat switch;

(c) compact control means operatively connected between the thermostat means and the load, for conducting power to the load in the heat-on condition, and for interrupting power to the load in the heat-off condition; (d) means for mounting the compact transformer means and the compact control means at the electrical outlet box, to simplify the retrofit replacement of a conventional line voltage-operated thermostat with a low voltage-operated thermostat; and (e) said transformer means and said control means being operatively connected to the hot, neutral and load wires to permit operation of the heat anticipator means.

22. A compact temperature-regulated power control arrangement for switching an electrical power source having a hot wire at a rated line voltage to a heating/cooling system load having a load wire, comprising:

(a) a low voltage-operated thermostat means mounted at an electrical outlet box to which the hot and load wires are routed in a room whose temperature is to be regulated, and being settable at any desired predetermined time and temperature characteristic, said thermostat means being operative for sensing the room temperature, and having a low voltage-operated thermostat switch switchable at a low voltage below the line voltage between a heat-off condition in which a heat-off signal is generated when the sensed temperature is above a set temperature, and a heat-on condition in which a low voltage heat-on signal is generated when the sensed temperature is below the set temperature;

(b) compact transformer means operatively connected between the power source and the thermostat means, for converting the line voltage to the low transformer voltage required to operate the thermostat switch;

(c) compact control means operatively connected between the thermostat means and the load, for conducting power to the load in the heat-on condition, and for interrupting power to the load in the heat-off condition;

(d) means for mounting the compact transformer means and the compact control means at the electrical outlet box, to simplify the retrofit replacement of a conventional line voltage-operated thermostat with a low voltage-operated thermostat; and (e) said transformer means and said control means being operatively connected to the hot and the load wires to enable the control means to self-heat and to generate a low level heating effect in the vicinity of the thermostat switch, to thereby shorten the time required by the latter to maintain the heat-on condition.

23. A method of installing a compact temperature-regulated power control arrangement for switching an electrical power source having a hot wire at a rated line voltage to a heating/cooling system load having a load wire, comprising the steps of:

(a) mounting a low voltage-operated thermostat means at an electrical outlet box in a room whose temperature is to be regulated;

(b) routing the hot wire and the load wire to the electrical outlet box;

(c) setting the thermostat means at any desired predetermined time and temperature characteristic for sensing the room temperature, and switching the thermostat means at a low voltage below the line voltage between a heat-off condition in which a heat-off signal is generated when the sensed temperature is above a set temperature, and a heat-on condition in which a low voltage heat-on signal is generated when the sensed temperature is below the set temperature;

(d) operatively connecting a converter between the power source and the load, for converting the line voltage to the low voltage required to operate the thermostat means;

(e) operatively connecting a controller between the thermostat means and the load, for conducting power to the load in the heat-on condition, and for interrupting power to the load in the heat-off condition;

(f) mounting the converter and the controller at the electrical outlet box, to simplify the retrofit replacement of a conventional line voltage-operated thermostat with a low voltage-operated thermostat; and (g) operatively connecting the converter and the controller only to the hot and the load wires at the electrical outlet box.

* * * * *